United States Patent [19]

Sugimoto et al.

[11] Patent Number: 5,015,723
[45] Date of Patent: May 14, 1991

[54] PROCESS FOR PRODUCING AROMATIC POLYESTERS

[75] Inventors: Hiroaki Sugimoto; Yoshitaka Ohbe, both of Tsukuba; Kazuo Hayatsu, Ibaraki; Atsukazu Iwata, Takatsuki, all of Japan

[73] Assignee: Sumitomo Chemical Company, Limited, Osaka, Japan

[21] Appl. No.: 400,131

[22] Filed: Aug. 28, 1989

[30] Foreign Application Priority Data

Sep. 2, 1988 [JP] Japan ................................ 63-220843
Sep. 2, 1988 [JP] Japan ................................ 63-220846
Sep. 21, 1988 [JP] Japan ................................ 63-238558

[51] Int. Cl.$^5$ ...................... C08G 63/02; C08G 63/18; C08G 63/00; C08G 67/00
[52] U.S. Cl. .................................. 528/190; 528/176; 528/193; 528/194; 528/271; 528/272
[58] Field of Search ............... 528/176, 190, 193, 194, 528/271, 272

[56] References Cited

U.S. PATENT DOCUMENTS

| | | | |
|---|---|---|---|
| 4,219,629 | 8/1980 | Storm | 525/167 |
| 4,311,823 | 1/1982 | Imai et al. | 528/181 |
| 4,429,100 | 1/1984 | Charbonneau et al. | 528/193 |
| 4,429,105 | 1/1984 | Charbonneau et al. | 528/207 |
| 4,529,565 | 7/1985 | Kasatani et al. | 528/190 |
| 4,664,972 | 5/1987 | Connolly | 528/193 |
| 4,684,712 | 8/1987 | Ueno et al. | 528/176 |
| 4,719,280 | 1/1988 | Irwin | 528/176 |
| 4,731,432 | 3/1988 | Portugall | 528/190 |
| 4,746,566 | 5/1988 | Connolly | 528/190 |

FOREIGN PATENT DOCUMENTS

| | | |
|---|---|---|
| 62-265341 | 11/1987 | Japan . |
| 63-122730 | 5/1988 | Japan . |
| 63-154734 | 6/1988 | Japan . |
| 63-186760 | 8/1988 | Japan . |
| 63-210127 | 8/1988 | Japan . |
| 63-264628 | 11/1988 | Japan . |

Primary Examiner—Morton Foelak
Assistant Examiner—T. Mosley
Attorney, Agent, or Firm—Stevens, Davis, Miller & Mosher

[57] ABSTRACT

An aromatic polyester of good processability and heat resistance is prepared by charging starting materials in a reaction vessel, carrying out polycondensation reaction in the vessel until the flow temperature of the produced aromatic polyester falls in the temperature range of from 240° C. to a temperature of 20° C. below the reaction temperature and discharging the reaction product from the vessel in the molten state.

The aromatic polyester obtained by the present invention can be used molded into various forms such as fiber, film, etc. In addition, compositions comprising this aromatic polyester and glass fibers, mica, talc, silica, potassium titanate, wollastonite, calcium carbonate, quartz, iron oxide, graphite, carbon fibers, etc. can be used in machine parts, electric and electronic parts and automobile parts because of their excellent mechanical properties, electric properties, chemical resistance and oil resistance.

6 Claims, 1 Drawing Sheet

PROCESS FOR PRODUCING AROMATIC POLYESTERS

The present invention relates to a process for producing an aromatic polyester having an excellent heat resistance and a good melt-moldability.

1 ... roll, 2 ... grooves on the roll surface.

It has long been tried to obtain a heat-resistant polyester, and there are many informations on aromatic polyesters comprising an aromatic dicarboxylic acid and an aromatic diphenol as well as aromatic polyesters obtained from an aromatic oxycarboxylic acid.

There have been known various processes for producing the aromatic polyesters such as a suspension polymerization method, an interfacial polymerization method, a solution polymerization method, a bulk polymerization method, etc. The former three have a problem of after-treatment. For example, removal of the solvent or washing of the polymer is necessary, and also the COD load of waste water is large. The bulk polymerization method is economically desirable. However, the equilibrium constant of polycondensation reaction of the polyester is small as compared with that of polyamides. Therefore, in order to promote the polycondensation reaction, it has been necessary to raise the reaction temperature or carry out the reaction under reduced pressure and yet to rapidly remove by-products. Particularly, for producing heat-resistant polyesters, a reaction at high temperatures is required, and it has been an obstacle to the stable running of the process for producing the polymer.

Also, it sometimes occurs that low-boiling compounds produced at the time of polymerization and unreacted materials remain in the polymer. They, in turn, are gasified at the time of molding to pollute environments or they are gradually gasified in the moldings to break the mechanism of assembled products.

In view of such the situation, an object of the present invention is to provide a process for stably producing an aromatic polyester having a high heat resistance and good moldability, particularly a good melt-moldability, of a uniform quality with little low-boiling substances.

According to the present invention, there is provided a process for producing an aromatic polyester which comprises

(1) charging the following Components to a vessel, (A) 30 to 80% by mole of Component A consisting of at least one compound represented by the formula, wherein $R_1$ is hydrogen, formyl, acetyl, propionyl or benzoyl group, and $R_2$ is hydrogen, $C_1$-$C_6$ alkyl or $C_6$-$C_{18}$ aryl group, or a mixture of not less than 50% by mole of at least one compound represented by the formula, wherein $R_1$ and $R_2$ represent the same meanings as defined above, and less than 50% by mole of at least one compound represented by the formula, wherein $R_1$ and $R_2$ represent the same meanings as defined above,

(B) 10 to 35% by mole of Component B consisting of at least one compound represented by the formula,

$$R_3O-A_1-OR_3$$

wherein $A_1$ is a divalent aromatic residue, and $R_3$ is hydrogen, acetyl, propionyl or benzoyl group, and (C) 10 to 35% by mole of Component C consisting of at least one compound represented by any one of the formulas, wherein $R_4$ is hydroxyl, $C_1$-$C_6$ alkyloxy, $C_6$-$C_{18}$ aryloxy group or a halogen atom, or a mixture of not less than 50% by mole of at least one compound represented by any one of the formulas, wherein $R_4$ represents the same meaning as defined above, and less than 50% by mole of at least one compound represented by the formula, wherein Ar is a divalent aromatic residue, and $R_4$ represents the same meaning as defined above, (2) carrying out polycondensation reaction at a temperature of 270° to 380° C., and (3) discharging the aromatic polyester in a molten state from the vessel when the flow temperature of the aromatic polyester reaches a temperature between 240° C. and a temperature not less than 20° C. below the reaction temperature.

The aromatic polyesters obtained by polycondensing the foregoing Components A, B and C in amounts of 30 to 80 mole %, 10 to 35 mole % and 10 to 35 mole %, respectively are crystalline polymers and are superior in mechanical properties, chemical resistance and heat resistance. Preferably, the mixing ratio of these Components falls in the range of 40 to 70 mole %: 15 to 30 mole %: 15 to 30 mole %. Some of the aromatic polyesters show anisotropy at a molten state and a good melt-moldability.

When the content of Component A exceeds 80 mole %, the resulting aromatic polyester does not melt by heating only partially, so that its melt-processability becomes markedly poor. When the content is less than 30 mole %, the aromatic polyester is less crystalline. When the content of the compound having a phenylene group in Component A is less than 50 mole %, the aromatic polyester becomes less crystalline, so that such the content is not preferred.

When the contents of Components B and C are 10 to 35 mole %, the aromatic polyester obtained exhibits well-balanced characteristics.

The molar ratio of Components B and C at the time of feeding is not critical, but preferably 100:100 to 110:100 in terms of the physical properties, particularly thermal stability, of the resulting polymer.

Specific examples of the compounds for Component A are p-hydroxybenzoic acid, p-formyloxybenzoic acid, p-acetoxybenzoic acid, p-propyloxybenzoic acid, methyl p-hydroxybenzoate, propyl p-hydroxybenzoate, phenyl p-hydroxybenzoate, benzyl p-hydroxybenzoate, methyl p-acetoxybenzoate, 2-hydroxy-6-naphthoic acid, 2-acetoxy-6-naphthoic acid, methyl 2-hydroxy-6-naphthoate, phenyl 2-hydroxy-6-naphthoate, methyl 2-acetoxy-6-naphthoate, etc. Particularly preferred compounds are p-hydroxybenzoic acid and its ester derivatives.

Specific examples of the compounds for Component B are hydroquinone, resorcinol, 4,4'-dihydroxydiphenyl, 4,4'-dihydroxybenzophenone, 4,4'-dihydroxydiphenylmethane, 4,4'-dihydroxydiphenylethane, 4,4'-dihydroxydiphenyl ether, 2,2-bis(4-hydroxyphenyl)propane, 4,4'-dihydroxydiphenyl sulfone, 4,4'-dihydroxydiphenyl sulfide, 2,6-dihydroxynaphthalene, 1,4-dihydroxynaphthalene, 1,5-dihydroxynaphthalene, 1,4-diacetoxybenzene, 1,3-diacetoxybenzene, 4,4'-dipropionyloxydiphenyl, 2,6-diformyloxynaphthalene, etc. and their derivatives having a substituent such as an alkyl, aryl or alkoxy group or a halogen atom at the nucleus. Particularly preferred compounds are hydroquinone, 4,4'-dihydroxydiphenyl and their ester derivatives.

Specific examples of the Compounds for Component C are terephthalic acid, isophthalic acid, 4,4'-dicarboxydiphenyl, 1,2-bis(4-carboxyphenoxy)ethane, 2,6-dicarboxynaphthalene, 1,4-dicarboxynaphthalene, 1,5-dicarboxynaphthalene, dimethyl terephthalate, dimethyl isophthalate, diphenyl terephthalate, diphenyl isophthalate, terephthalic acid dichloride, isophthalic acid dichloride, 4,4'-dimethoxycarbonyldiphenyl, 2,6-dimethoxylcarbonylnaphthalene, 1,4-dichlorocarbonylnaphthalene, 1,5-diphenoxycarbonylnaphthalene and their derivatives having a substituent such as an alkyl, aryl or alkoxy group or a halogen atom at the nucleus.

The process for producing an aromatic polyester of the present invention comprises the polycondensation of a mixture comprising the foregoing Components A, B and C in a polymerization vessel. These Components may be fed to the polymerization vessel in either one lot or divided lots. The reaction may be carried out in an inert gas atmosphere (e.g. nitrogen) under a normal pressure, reduced pressure or combination thereof. The reaction may be carried out with any of batch process, continuous process and combination thereof.

Prior to the polycondensation, one or more compounds of those included in Components A, B and C may be converted to a compound which is more reactive in polycondensation, for example by esterification. This modification may be carried out in a vessel other than or in the same vessel as the reaction vessel wherein the polycondensation is to be carried out.

The temperature of the polycondensation is 270° to 380° C., preferably 270° to 350° C., more preferably 280° to 330° C. When the temperature is lower than 270° C., the reaction proceeds slowly. When the temperature exceeds 380° C., side reactions such as decomposition, etc. sometimes occur to color the resulting polymer. Different reaction temperatures may be utilized within the above temperature range if the reaction is carried out in plural stages. When the reaction vessel is divided into plural stages or partitioned into many compartments, or the reaction temperature is varied in plural stages, the reaction temperature in the last stage is the polycondensation temperature referred to in the present invention. So long as the foregoing relationship between the flow temperature of the aromatic polyester and the reaction temperature is satisfied, the aromatic polyester, a reaction product, may be discharged in a molten state, in some cases, in the course of temperature increase or immediately after the maximum temperature is reached.

Compounds of Ge, Sn, Ti, Sb, Co, Mn, etc. may be used as a catalyst for the polycondensation reaction.

The shape of the reaction vessel may be any of the well-known ones. In the case of vertical-type stirring vessels, multi-stage paddle blades, turbine blades and double helical blades are preferred. In the case of horizontal-type stirring vessels, uniaxial or biaxial stirrers having blades of various shapes (e.g. lens-shaped blades, glasses-like blades, multi-circular flat blades) mounted at right angles to the axis are preferred. Further, twist may be given to the blades in order to improve the stirring efficiency and feed mechanism.

Heating of the reaction vessel is usually carried out by the use of a heat medium, gas or electric heater. For the purpose of uniform heating, it is desirable to mount a blade, a baffle plate, etc. on a stirring axis.

The polycondensation time is not critical and should properly be determined by the other reaction conditions. At the reaction temperature of 270°–380° C., the reaction time is usually 0.5 to 5 hours.

What is important to the present invention is to discharge the polyester obtained by the polycondensation reaction from the reaction vessel at a point when the flow temperature of the polyester reaches a temperature between 240° C. and a temperature not less than 20° C. below the polycondensation temperature. More preferably, the polyester is discharged at a point when its flow temperature reaches a temperature between 260° C. and a temperature not less than 25° C. below the polycondensation temperature. Unless the flow temperature is 240° C. or higher, the molecular weight of the obtained polyester is not high enough, so that there occur problems in moldability and physical properties of the product. Moreover, if after-treatment such as solid-phase polymerization is applied to the polyester of low molecular weight, melt-adhesion between the polyester masses occurs and by-products are produced in large amounts, which is not preferred economically. When the flow temperature is too close to the polycondensation temperature, the viscosity of the polyester becomes too high to discharge the polyester from the reaction vessel. Further, the uniform mixing and heating of the polyester become hard, whereby the thermal stability of the polymer is reduced.

Preferably, the polyester is discharged in a molten state in an inert gas atmosphere. However, if the moisture content of the polyester is low, the polyester may be discharged in the air.

As a mechanism by which the polyester is discharged in a molten state from the vessel, extruders and gear pumps are thought of, but simple valves will do. The discharged polyester can be cooled and finely pulverized by strand cutters, sheet cutters, crushers, etc. according to the objects.

One or more solvents, lubricants, stabilizers and additives may be added to the polycondensation system on condition that they cause no large change in the melt viscosity.

The aromatic polyester thus obtained can be used as it is, but it is preferred to subject the polyester to solid-phase polymerization in order to remove the unreacted materials and improve the physical properties.

When the solid-phase polymerization is carried out, the resulting aromatic polyester is mechanically pulverized to particles having an average particle diameter of 3 mm or less, preferably 0.5 mm or less, and treated as it is at a temperature of 250° to 370° C. for 1 to 20 hours in an inert gas atmosphere and/or under reduced pressure. Preferably, the aromatic polyester particles are treated at 370° C. or slightly lower than 370° C. for 2 to 10 hours.

When the particles have an average particle diameter of more than 3 mm, the surface layer and the inner part of the particles are different from each other in the polymerization rate, content of the unreacted materials and diffusion time of by-products newly produced by the solid-phase polymerization. As a result, there is sometimes caused problems of physical properties of the product. For example, the molecular weight distribution of the product becomes widened and the by-products to be removed remain in the product.

In order to prepare the particles of the polyester for the solid-phase polymerization, there can be preferably employed a method for granulating the aromatic polyester comprising supplying the aromatic polyester in a molten state between two rolls, at least one of which has plural grooves on the surface, and which are arranged so that their rotation axes are parallel to each other; passing the polyester through the grooves by rotating the rolls to be extruded into strings or sheets formed by junction of plural strings; cooling to solidify the extrudate; and cutting or pulverizing the solidified extrudate.

A conventionally employed method for granulating polymers is a method in which a polymer is extruded from slits, holes, etc. into sheets or strings, and the extruded sheets or strings, in a semi-molten state or after cooled and solidified, are cut or pulverized.

In practicing the method, there have been such drawbacks that the equipment becomes large-sized and expensive.

Further, a wide space is required for discharging high molecular compounds like the aromatic polyester produced by the process of the present invention in a molten state from a reaction vessel.

The present inventors have found that the aromatic polyester in a molten state can easily be granulated by a method comprising supplying the molten polyester between to rolls, at least one of which has plural grooves on the surface, and which are arranged so that their rotation axes are parallel to each other; passing the polyester through the grooves by rotating the rolls to be extruded into strings or sheets formed by junction of plural strings; cooling to solidify the extrudate; and cutting or pulverizing the solidified extrudate.

Two rolls referred to herein, at least one of which has plural grooves on the surface, and which are arranged so that their rotation axes are parallel to each other, mean a combination of two rolls having grooves of a definite width cut in the surface, or the roll having grooves and a flat-surface roll.

Figure 1:
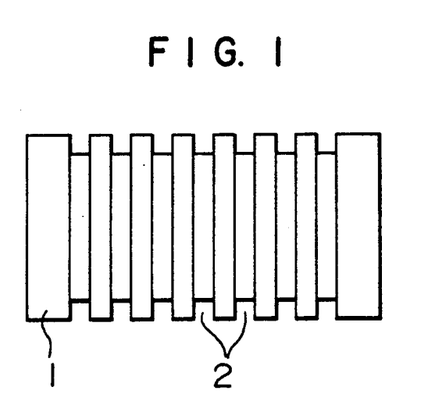
FIG. 1 shows a plane view of a roll.
Figure 2:
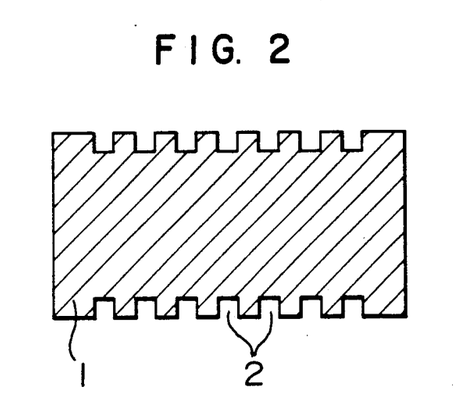
FIG. 2 shows a sectional view obtained by cutting a roll with a plane passing the rotation axis of the roll.

A preferred roll is a roll having grooves on the surface are cut parallel to one another in the direction of rotation of the roll. FIG. 1 shows a plane view of a roll having plural grooves cut parallel to one another in the surface in the direction of rotation. FIG. 2 shows a sectional view obtained by cutting the same roll with a plane passing the rotation axis of the roll.

If the rotation axes are parallel to each other, similarly tapered rolls will do.

When both of the roll have grooves cut in the surface, in order to obtain pellets of the same size, it is necessary for the grooves to have the same depth and width, although it doesn't matter if the rolls are different from each other in the diameter of the roll and the pitch and position of the groove. Further, it doesn't matter if the rolls are arranged so that the respective grooves of the rolls face each other or do not face each other.

Figure 3:
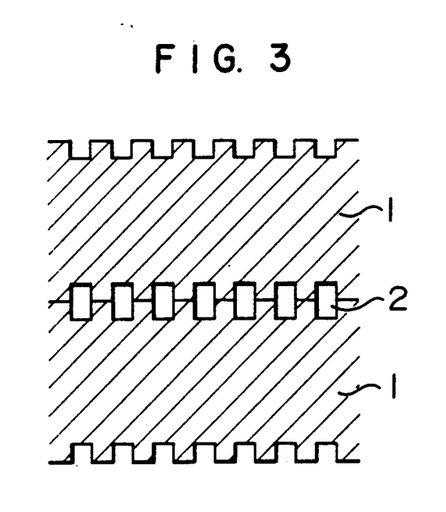
FIG. 3 shows a sectional view obtained by cutting two rolls with a plane passing the rotation axes of the rolls.
Figure 4:
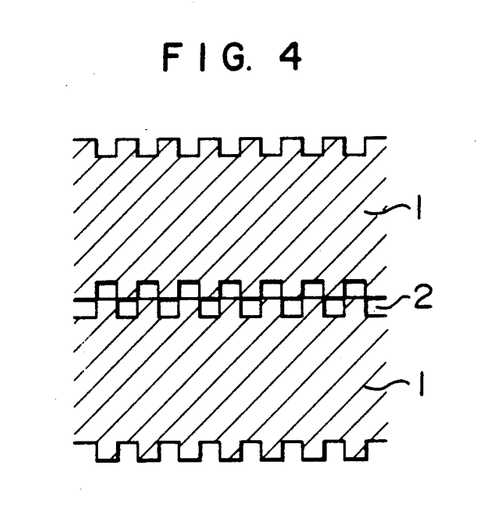
FIG. 4 shows a sectional view obtained by cutting two rolls with a plane passing the rotation axes of the rolls.

FIGS. 3 and 4 show sectional views obtained by cutting two rolls, which are arranged so that the rotation axes of the rolls are parallel to each other and the rolls are brought into line-contact parallel to the rotation axes, with a plane passing the rotation axes of the rolls. FIG. 3 shows a state wherein the grooves of the two rolls face each other, and FIG. 4 shows a state wherein the grooves are slidden by one pitch against each other.

When the depth of grooves on the roll surface is larger than the distance between the rolls, the subsequent cutting and pulverization may be advantageously carried out.

The aromatic polyester in a molten state can be extruded into strings or, depending upon the distance between the rolls, sheets formed by junction of plural strings by supplying the molten polyester between two rolls and passing it through the grooves by rotating the rolls. It is advisable to carry out extrusion with controlling the surface temperature of the roll. For this purpose, it is also effective in some cases to cool or heat the roll by passing a medium through the interior of the roll. The surface temperature of the roll may be controlled by blowing a liquid or gas against the roll surface, which liquid or gas does not injure the physical properties of the aromatic polyester.

The number of rotations of the two rolls may be varied depending upon the rate of treatment. It is a matter of course, however, that the number of rotations needs to be selected in connection with the roll temperature on condition that the aromatic polyester on the roll is not substantially solidified.

The rates of rotation of the two rolls may be different from each other, but it is preferred in terms of handling that the rates of rotation are the same.

By rotating the two rolls, the aromatic polyester in a molten state is passed through the grooves and extruded into strings or sheets formed by junction of plural strings. The extrudate is then cooled, solidified and cut or pulverized.

The directions of rotation of the two rolls are preferably a direction of easy flow, i.e. a direction which makes the movement of the sheet-like extrudate easy.

Cutting and pulverization can be carried out with a known equipment. For example, there are mentioned strand pelletizers, sheet pelletizers, gear-type cutters, crushers, etc.

The average particle diameter of the particles obtained can be controlled by changing the width and depth of the grooves on the roll surface depending upon the objects. The depth and width of the grooves are not particularly limited in size, but they are preferably 1 to 7 nm, more preferably 3 to 5 mm. When the size is less than 1 mm, there tend to occur problems that the rate of treatment is low and a load of rotation of the rolls tend to increase. When the size exceeds 7 mm, the size of extrudate is sometimes too large to be cut or pulverized after solidification.

The method described above enables simple and economical granulation of the aromatic polyester in a molten state without a wide space which has been required for the conventional method.

The rate of temperature increase and treatment temperature for the solid-phase polymerization may be selected so as to prevent the melt-adhesion between the aromatic polyester particles. The melt-adhesion is not desired because the surface area of the reaction mass decreases to delay the rate of polycondensation reaction and the removal of low-boiling substances.

The solid-phase polymerization can be carried out effectively at a temperature of 250° to 370° C. which causes no melt-adhesion and in an inert gas atmosphere and/or under reduced pressure. When the temperature is below 250° C., the reaction proceeds too slow to take much time, which is not economical. At a temperature higher than 370° C., decomposition of the polymer occurs. It is preferred to carry out the solid-phase polymerization in an inert gas atmosphere and/or under reduced pressure. When the solid-phase polymerization is carried out under reduced pressure, it is advisable to allow an inert gas to enter the polymerization system from the outside. When air, that is oxygen, is present, the polyester is oxidized, and as a result, a reduction in the physical properties and coloration tend to occur. Specific examples of the inert gas are nitrogen, hydrogen, helium, argon, carbon dioxide gas, etc. Ammonia, amines and steam are not preferred because they cause decomposition of the polyester. As equipments for the solid-phase polymerization, the known dryers, reactors, mixers, electric furnaces, etc. can be used.

The present invention will be illustrated specifically with reference to the following examples and comparative examples, but it is not limited to these examples.

The flow temperature of the polyester is the index of melt-flowability. It is expressed by a temperature at which the resin, a test sample, shows a melt viscosity of 48,000 poises when it is melted by heating at a rate of temperature increase of 4° C./min and extruded from a nozzle of 1 mm in internal diameter and 10 mm in length under a load of 100 kg/cm$^2$. The flow temperature was measured with a capillary rheometer (Flow Tester CFT-500 produced by Shimadzu Corp.).

Since the aromatic polyesters produced by the present invention are crystalline, there are not solvents which can dissolve them uniformly, and therefore the molecular weight of many of them is difficult to measure. For this reason, the flow temperature is used as the measure of the molecular weight.

The optical anisotropy was measured by heating the resin powder, a test sample, having an average particle diameter of 250 μm or less placed on a heating stage, at a rate of temperature increase of 25° C./min under a polarized light, and macroscopically observing the state of the powder.

The weight loss was measured with a thermobalance (TG-DTA Standard-type produced by Rigaku Denki Co., Ltd.) as follows: About 20 mg of the resin, a test sample, having an average particle diameter of 250 μm or less is heated in the air at a rate of temperature increase of 10° C./min, and a change in weight during the temperature increase is measured with the lapse of time. Further, a temperature at which a weight loss of 2.5% was obtained from the measurement values obtained above.

The tensile test for the molded products was carried out according to ASTM D-638 under the following conditions: Test piece, dumbbell-shaped test piece; number of samples, 6; gauze length, 40 mm; and tensile rate, 5 mm/min.

The heat distortion temperature was measured under a pressure of 18.6 kg/cm$^2$ according to ASTM D-648. The whiteness of the molded products was measured using a plate-form molded product of 40 mm × 40 mm in size as a test sample and a digital color-difference meter (ND-101-DP produced by Nippon Denshoku Kogyo Co., Ltd.) as a tester. The measurement values obtained were corrected with the whiteness of pure black as 0 and that of pure white as 100 and using the standard of titanium oxide (whiteness, 94.5).

EXAMPLE 1

To a polymerization vessel equipped with a three-stage paddle blade having a small clearance between the wall of the vessel and the stirring blade, were fed 1,152 g (6.40 moles) of p-acetoxybenzoic acid, 491 g (1.82 moles) of 4,4′-diacetoxydiphenyl and 436 g (1.80 moles) of 4,4′-dicarboxydiphenyl. The contents were heated from 200° C. to 320° C. at a rate of 1° C./min with stirring in a nitrogen gas atmosphere and polymerized at 320° C. for 2 hours and 20 minutes.

In this period, acetic acid produced as by-product by the polycondensation reaction was continuously distilled off from the reaction system. The polymer was sampled in the course of the polymerization, and its flow temperature was measured. The flow temperature was 267° C. after 1 hour's polymerization at 320° C., and 286° C. after 2 hours' polymerization at 320° C.

A valve at the bottom of the polymerization vessel was opened to discharge the polyester into a discharge box which was in a nitrogen gas atmosphere. The polyester could easily be discharged from the vessel in a molten state. The reaction vessel was later disassembled and examined, but adhesion of the polyester to the wall of the vessel and the valve portion was little observed.

The discharged polyester was pulverized to particles having an average particle diameter of 1 mm or less on a crusher, and then the flow temperature was measured to find that it was 293° C. The yield of the polymer as 1,455 g (98.8% of the theoretical yield).

This powdery polymer was insoluble in any of xylene, tetrahydrofuran, chloroform, phenol/tetrachloroethane (6:4 by volume) mixture and m-cresol. This polymer was observed to show optical anisotropy in molten states higher than 325° C. Wide-angle x-ray diffraction analysis showed that this polymer was crystalline. This polymer showed no weight loss under 250° C. The temperature at which this polymer showed a weight loss of 2.5% against the original weight was 412° C.

A mixture of 600 g of this polyester and 400 g of glass fibers having a diameter of 13 μm and an average length of 50 μm could be well granulated at 330° C. into pellets. These pellets could be well injection-molded on an injection molding machine (Neo-mat N47/28 produced by Sumitomo Heavy Industries, Ltd.) at a cylinder temperature of 335° C. to obtain test pieces. The test pieces obtained had the following properties: Tensile strength, 980 kg/cm$^2$; modulus of elasticity, 5.2×10$^4$ kg/cm$^2$; heat distortion temperature, 246° C.; and whiteness, 73.

Comparative Example 1

In Example 1, on continuing the polycondensation reaction at 320° C. for further 2 hours, a stirring load abnormally increased to stop stirring. The flow temperature of the polyester at that time was 311° C. The polyester could not be discharged from the reaction vessel.

Comparative Example 2

In Example 1, the polyester was withdrawn in the same manner as in Example 1 at a point when the polycondensation temperature reached 320° C. The flow temperature of the polyester at that time was 226° C.

This polymer showed a weight loss of 1.7% below 250° C. A temperature at which this polymer showed a weight loss of 2.5% against the original weight was 277° C.

A mixture of 600 g of this polyester and 400 g of glass fibers having a diameter of 13 μm and an average length of 50 μm was granulated, but gas evolution was remarkable, leaving problems behind.

EXAMPLE 2

In the same manner as in Example 1, 720 g (4.00 moles) of p-acetoxybenzoic acid, 546 g (2.02 moles) of 4,4'-diacetoxyphenyl and 332 g (2.00 moles) of terephthalic acid were fed to a polymerization vessel and subjected to polycondensation. When 2 hours elapsed at 320° C., the flow temperature of the reactant by sampling reached 286° C., and the contents were discharged. A pale yellowish brown polyester could be obtained in a molten state without problems.

The yield of the polyester was 1,103 g (99.2% of the theoretical yield).

This polymer was insoluble in any of the same solvents as mentioned in Example 1. This polymer was observed to show optical anisotropy in molten states higher than 325° C. Wide-angle X-ray diffraction analysis showed that this polymer was crystalline.

This polymer showed no weight reduction until 250° C. The temperature at which this polymer showed a weight loss of 2.5% against the original weight was 410° C.

In the same manner as in Example 1 except that this polymer was used, a mixture of this polymer and the glass fibers was granulated and injection-molded at 330° C. In this case, the granulation processability and moldability were good. The test pieces obtained had the following properties: Tensile strength, 1,040 kg/cm$^2$; modulus of elasticity, 6.7×10$^4$ kg/cm$^2$; heat distortion temperature, 238° C.; and whiteness, 74.

EXAMPLE 3

To the same reaction vessel as used in Example 1 were fed 607 g (4.40 moles) of p-hydrobenzoic acid, 406 g (2.00 moles) of terephthalic acid dichloride and as a reaction medium 1.8 liters of xylene. The mixture was stepwise allowed to react at 120° C. for 1 hour, at 130° C. for 1 hour and then at 140° C. for 4 hours with violently stirred in a nitrogen gas atmosphere. Hydrogen chloride produced as by-product by the reaction was neutralized with an aqueous caustic soda solution. The conversion was 92%. Thereafter, 323 g (2.02 moles) of 2,6-dihydroxynaphthalene and 448 g (4.40 moles) of acetic acid anhydride were added to the mixture, and acetylation was carried out at 140° C. for 4 hours. The reaction mixture was then heated to 320° C. at a rate of temperature increase of 2° C./min while removing xylene, acetic acid anhydride and acetic acid. The polycondensation was carried out substantially free from solvents. When 20 minutes elapsed after the flow temperature of the contents had reached 275° C. by sampling, the valve at the bottom of the reaction vessel was opened. The polyester could be discharged without problems. The flow temperature of the discharged polyester was 282° C.

The yield of the polyester was 1,100 g (99.3% of the theoretical yield).

This polymer was insoluble in any of the same solvents as mentioned in Example 1. This polymer was observed to show optical anisotropy in molten states higher than 330° C. Wide-angle X-ray diffraction analysis showed that this polymer was crystalline.

This polymer showed no weight reduction until 250° C. The temperature at which this polymer showed a weight loss of 2.5% against the original weight was 425° C.

In the same manner as in Example 1 except that this polymer was used, a mixture of this polymer and the glass fibers was granulated and injection-molded at 330° C. In this case, the granulation processability and moldability were good. The test pieces obtained had the following properties: Tensile strength, 1,100 kg/cm$^2$; modulus of elasticity, 6.1×10$^4$ kg/cm$^2$; heat distortion temperature, 248° C; and whiteness, 75.

EXAMPLE 4

To the same reaction vessel as used in Example 1 were fed 576 g (3.20 moles) of p-acetoxybenzoic acid, 644 g (2.80 moles) of 2-acetoxy-6-naphthoic acid, 426 g (2.05 moles) of 1,4-diacetoxy-2-methylbenzene and 332 g (2.00 moles) of terephthalic acid. The contents were heated from 200° C. to 310° C. at rate of 1° C./min with stirring in a nitrogen gas atmosphere and polymerized at 310° C. for 2 hours and 50 minutes.

In this period, acetic acid produced as by-product by the polycondensation reaction was continuously distilled off from the reaction system. The polymer was sampled in the course of the polymerization, and its flow temperature was measured. The flow temperature was 242° C. after 1 hour's polymerization at 310° C., 261° C. after 2 hours' polymerization at 310° C. and 272° C. after 2.5 hours' polymerization at 310° C. Thereafter, a valve at the bottom of the polymerization vessel was opened to discharge the polyester into a discharge box which was in a nitrogen gas atmosphere. The polyester could easily be discharged in a molten state.

The flow temperature of the discharged polyester was 279° C.

The yield of the polyester was 1,357 g (99.2% of the theoretical yield).

This polymer was insoluble in any of the same solvents as mentioned in Example 1. This polymer was observed to show optical anisotropy in molten states higher than 320° C. Wide-angle X-ray diffraction analysis showed that this polymer was crystalline.

This polymer showed no weight loss until 250° C. the temperature at which this polymer showed a weight loss of 2.5% against the original weight was 435° C.

In the same manner as in Example 1 except that this polymer was used, a mixture of this polymer and the glass fibers was granulated and injection-molded at 330° C. In this case, the granulation processability and moldability were good. The test pieces obtained had the following properties: Tensile strength, 1,150 kg/cm$^2$; modulus of elasticity, 6.1×10$^4$ kg/cm$^2$; heat distortion temperature, 248° C.; and whiteness, 73.

EXAMPLE 5

To a polymerization vessel equipped with a three-stage paddle blade having a small clearance between the wall of the vessel and the stirring blade, were fed 1,152 g (6.40 moles) of p-acetoxybenzoic acid, 491 g (1.82 moles) of 4,4'-diacetoxydiphenyl and 436 g (1.80 moles) of 4,4'-dicarboxydiphenyl. The contents were heated from 200° C. to 320° C. at a rate of 1° C./min with stirring in a nitrogen gas atmosphere and polymerized at 320° C. for 2 hours and 20 minutes.

In this period, acetic acid produced as by-product by the polycondensation reaction was continuously distilled off from the residue system. The polymer was sampled in the course of the polymerization, and its flow temperature was measured. The flow temperature was 260° C. after 1 hour's polymerization at 320° C., and 282° C. after 2 hours' polymerization at 320° C.

A valve was opened to discharge the polyester into a discharge box which was in a nitrogen gas atmosphere. The polyester could easily be discharged in a molten state. The reaction vessel was later disassembled and examined, but adhesion of the polyester to the wall of the vessel and the valve portion was little observed. The yield of the polyester obtained was 1,462 g (99.2% of the theoretical yield).

The discharged polyester was pulverized to particles having an average particle diameter of 1 mm or less on a crusher. Then the flow temperature was measured to find that it was 290° C. Optical anisotropy was observed in molten states higher than 325° C.

The polyester particles having an average particle diameter of 1 mm or less were fed to a 12-liter stainless steel rotary kiln. In a nitrogen gas atmosphere, the particles were stepwise heated from room temperature to 200° C. in 1 hour and from 200° C. to 270° C. in 4 hours, kept at 270° C. for 3 hours and then discharged. A weight reduction at the solid-phase polymerization was 1.1%.

This powdery polymer was insoluble in any of xylene, tetrahydrofuran, chloroform, phenol/tetrachloroethane (6:4 by volume) mixture and m-cresol. The flow temperature of this polymer was 337° C. Wide-angle X-ray diffraction showed that this polymer was crystalline. This polymer showed no weight loss until 300° C. The temperature at which this polymer showed a weight loss of 1.0% against the original weight was 445° C. The weight loss was only 2% or less even at 500° C.

A mixture of 600 g of this polyester and 400 g of glass fibers having a diameter of 13 μm and an average length of 50 μm could be well granulated at 350° C. into pellets. These pellets could be well injection-molded on an injection molding machine (Neo-mat N47/28 produced by Sumitomo Heavy Industries, Ltd.) at a cylinder temperature of 355° C. to obtain test pieces. The test pieces obtained had the following properties: Tensile strength, 1,210 kg/cm$^2$; modulus of elasticity, 7.2×10$^4$ kg/cm$^2$; heat distortion temperature, 283° C.; and whiteness, 72.

Comparative Example 3

In Example 5, on continuing the polycondensation reaction at 320° C. for further 2 hours, a stirring load abnormally increased to stop stirring. The flow temperature of the polyester at that time was 311° C., and the polyester could not be discharged from the reaction vessel.

Comparative Example 4

In Example 5, the polyester was discharged in the same manner as in Example 5 when the polycondensation temperature reached 320° C. The flow temperature of the polyester at that time was 226° C.

This polymer showed a weight loss of 1.7% until it reached 250° C. The temperature at which this polymer showed a weight loss of 2.5% against the original weight was 277° C.

This polyester was pulverized into particles having an average particle size of 1 mm or less and subjected to solid-phase polymerization with the same equipment and under the same conditions as in Example 5. The whole mass, however, was re-melted, and its molecular weight did not increase to the required level as its flow temperature showed 240° C., either.

Separately from this, the rate of temperature increase was made slow, i.e. the polyester particles were heated from 200° C. to 270° C. in 12 hours, kept at 270° C. for 3 hours and then discharged. The polyester particles continued to hold a powdery form, there being no melt-adhesion between the particles. However, the weight loss at this solid-phase polymerization was as large as 6.8%.

The flow temperature of this polyester was 331° C.

A mixture of 600 g of the polymer after this treatment and 400 g of glass fibers having a diameter of 13 μm and an average length of 50 μm was granulated at 350° C., but there was a problem that discharge of the strands was unstable as compared with Example 5.

Comparative Example 5

The polyester discharged in a molten state in Example 5 itself was subjected to thermal analysis. As a result, the polyester showed no weight loss until 250° C., but its weight loss to the original weight was 1.0% at 395° C. and 2.5% at 412° C. It is apparent from this result that low-boiling substances could be removed by the treatment in Example 5.

EXAMPLE 6

In the same manner as in Example 5, 720 g (4.00 moles) of p-acetoxybenzoic acid, 546 g (2.02 moles) of 4,4'-diacetoxydiphenyl and 332 g (2.00 moles) of terephthalic acid were fed to a polymerization vessel and subjected to polycondensation. When 2 hours elapsed at 320° C., the flow temperature of the reactant by sampling reached 286° C., and the contents were discharged. A pale yellowish brown polyester could be obtained in a molten state without problems.

The yield of the polyester was 1,103 g (99.2% of the theoretical yield).

This polymer was observed to show optical anisotropy in molten states higher than 325° C. This polymer showed no weight reduction until 250° C. The temperature at which this polymer showed a weight loss of 2.5% against the original weight was 410° C.

This polyester was pulverized into particles having an average particle diameter of 1 mm or less on a crusher and subjected to solid-phase polymerization with the same equipment and under the same conditions as in Example 5. The weight reduction at the solid-phase polymerization was 0.9%, and the flow temperature was 336° C.

This polymer was insoluble in any of the same solvents as mentioned in Example 5. Wide-angle X-ray diffraction analysis showed that this polymer was crystalline.

This polymer showed no weight loss until 300° C. The temperature at which this polymer showed a weight loss of 1.0% against the original weight was 455° C. The weight loss was only 2% or less even at 500° C.

In the same manner as in Example 5 except that this polymer was used, a mixture of this polymer and the glass fibers was granulated and injection-molded at 355° C. In this case, the granulation processability and moldability were good. The test pieces obtained had the following properties: Tensile strength, 1,180 kg/cm$^2$; modulus of elasticity, 6.9×10$^4$ kg/cm$^2$; heat distortion temperature, 285° C.; and whiteness, 72.

EXAMPLE 7

To the same reaction vessel as used in Example 5 were fed 607 g (4.40 moles) of p-hydroxybenzoic acid, 406 g (2.00 moles) of terephthalic acid dichloride and as a reaction medium 1.8 liters of xylene. The mixture was stepwise allowed to react at 120° C. for 1 hour, at 130° C. for 1 hour and then at 140° C. for 4 hours with violently stirred in a nitrogen gas atmosphere. Hydrogen chloride produced as by-product by the reaction was neutralized with an aqueous caustic soda solution. The conversion was 92%. Thereafter, 323 g (2.02 moles) of 2,6-dihydroxynaphthalene and 448 g (4.40 moles) of acetic acid anhydride were added to the mixture, and acetylation was carried out at 140° C. for 4 hours. The reaction mixture was then heated to 320° C. at a rate of temperature increase of 2° C./min while removing xylene, acetic acid anhydride and acetic acid, and polycondensation was carried out substantially free from solvents. When 20 minutes elapsed after the flow temperature of the contents had reached 275° C. by sampling, the valve at the bottom of the reaction vessel was opened to find that the polyester could be discharged without problems. The flow temperature of the discharged polyester was 282° C.

The yield of the polyester was 1,100 g (99.3% of the theoretical yield).

This polymer was observed to show optical anisotropy in molten states higher than 330° C. This polymer showed no weight loss until 250° C. The temperature at which this polymer showed a weight loss of 2.5% against the original weight was 425° C.

This polyester was pulverized into particles having an average particle diameter of 1 mm or less on a crusher and fed in a thickness of about 10 mm to a stainless steel container. The container was placed in an electric furnace. In a nitrogen gas atmosphere, the temperature was stepwise raised from room temperature to 200° C. in 1 hour, from 200° C. to 270° C. in 2 hours and from 270° C. to 360° C. in 3 hours, kept at 360° C. for 3 hours, and then the polyester was taken out. The weight loss at the solid-phase polymerization was 3.6%. The flow temperature of the polyester obtained was 395° C.

This polymer was insoluble in any of the same solvents as mentioned in Example 5. Wide-angle X-ray diffraction analysis showed that this polymer was crystalline.

This polymer showed no weight loss until 300° C. The temperature at which this polymer showed a weight loss of 1.0% against the original weight was 485° C.

In the same manner as in Example 5 except that this polymer was used, a mixture of this polymer and the glass fibers was granulated at 360° C. and injection-molded at 370° C. In this case, the granulation processability and moldability were good. The test pieces obtained had the following properties: Tensile strength, 1,050 kg/cm$^2$; modulus of elasticity, 5.4×10$^4$ kg/cm$^2$; heat distortion temperature, 321° C.; and whiteness, 71.

EXAMPLE 8

To the same reaction vessel as used in Example 5 were fed 576 g (3.20 moles) of p-acetoxybenzoic acid, 644 g (2.80 moles) of 2-acetoxy-6-naphthoic acid, 426 g (2.05 moles) of 1,4-diacetoxy-2-methylbenzene and 332 g (2.00 moles) of terephthalic acid. The contents were heated from 200° C. to 310° C. at a rate of 1° C./min with stirring in a nitrogen gas atmosphere and polymerized at 310° C. for 2 hours and 50 minutes.

In this period, acetic acid produced as by-product by the polycondensation reaction was continuously distilled off from the reaction system. The polymer was sampled in the course of the polymerization, and its flow temperature was measured. The flow temperature was 242° C. after 1 hour's polymerization at 310° C., 261° C. after 2 hours' polymerization at 310° C. and 272° C. after 2.5 hours' polymerization at 310° C. Thereafter, a valve at the bottom of the polymerization vessel was opened to discharge the polyester into a discharge box which was in a nitrogen gas atmosphere. The polyester could easily be discharged in a molten state.

The yield of the polyester was 1,357 g (99.2% of the theoretical yield), and the flow temperature of the polyester was 279° C.

This polymer was observed to show optical anisotropy in molten states higher than 320° C. This polymer showed no weight loss until 250° C. The temperature at which this polymer showed a weight loss of 2.5% against the original weight was 435° C.

This polyester was pulverized into particles having an average particle diameter of 1 mm or less on a crusher and subjected to solid-phase polymerization with the same equipment and under the same conditions as in Example 5. The weight loss at the solid-phase polymerization was 1.5%, and the flow temperature was 337° C.

This polymer was insoluble in any of the same solvents as mentioned in Example 5. Wide-angle X-ray diffraction analysis showed that this polymer was crystalline.

This polymer showed no weight loss until 300° C. The temperature at which this polymer showed a weight loss of 1.0% against the original weight was 480° C. The weight loss was only 2% or less even at 500° C.

In the same manner as in Example 5 except that this polymer was used, a mixture of this polymer and the glass fibers was granulated and injection-molded at 350° C. In this case, the granulation processability and moldability were good. The test pieces obtained had the following properties: Tensile strength, 1,400 kg/cm$^2$; modulus of elasticity, 8.3×10$^4$ kg/cm$^2$; heat distortion temperature, 280° C.; and whiteness, 73.

According to the present invention, a uniform and good-quality aromatic polyester containing few low-boiling substances can be produced stably.

The aromatic polyester obtained by the present invention can be used molded into various forms such as fiber, film, etc. In addition, compositions comprising this aromatic polyester and glass fibers, mica, talc, silica, potassium titanate, wollastonite, calcium carbonate, quartz, iron oxide, graphite, carbon fibers, etc. can be used in machine parts, electric and electronic parts and automobile parts because of their excellent mechanical properties, electric properties, chemical resistance and oil resistance.

EXAMPLE 9

A pair of the same chromium-plated rolls, 40 cm in length and 20 cm in diameter, having on the surface 30 grooves of 5 mm in both depth and width at intervals of 5 mm, were arranged as follows: The rotation axes of the two rolls are horizontal and besides parallel to each other and the two rolls are brought into line-contact with each other; and the respective grooves of the two rolls do not face each other by sliding the grooves by one pitch against each other, i.e. the grooves on one roll face the surface of the other roll. The arrangement is shown in FIG. 4. The two rolls arranged as above were placed below a fusion vessel.

On the other hand, to a polymerization vessel equipped with a three-stage paddle stirring blade having a small clearance between the wall of the vessel and the stirring blade, were fed 1,152 g (6.40 moles) of p-acetoxybenzoic acid, 436 g (1.80 moles) of 4,4'-dicarboxydiphenyl and 491 g (1.82 moles) of 4,4'-diacetoxydiphenyl. The contents were heated from 200° C. to 320° C. at a rate of 1° C./min with stirring in a nitrogen gas atmosphere and polymerized at 320° C. for 1 hour. In this period, acetic acid produced as by-product by the polycondensation reaction was continuously distilled off from the reaction system. After completion of the polymerization, a valve at the bottom of the polymerization vessel was opened, and the pale yellow reaction product was discharged in a molten state onto the granulation equipment comprising the foregoing two rolls. The rolls were cooled by passing water in the interior. The number of rotations of the rolls was 10 rpm, and the reaction product, a copolyester, was extruded into strings through the grooves. The yield of this string-shaped extrudate was 1,442 g (97.9% of the theoretical yield).

The flow temperature of this polymer was 278° C. This polymer was observed to show optical anisotropy in molten states higher than 320° C. Wide-angle X-ray diffraction analysis showed that this polymer was crystalline. This string-shaped product was pulverized on a crusher into granulates of 5 mm or less in size, and the granulates were heat-treated at 270° C. for 6 hours in a nitrogen gas atmosphere in a rotary kiln. The polymer thus obtained was insoluble in any of xylene, tetrahydrofuran and chloroform. This polymer had a flow temperature of 331° C. and showed no weight loss until 300° C. The temperature at which this polymer showed a weight loss of 1.0% against the original weight was 440° C. The weight loss was only 2% or less even at 500° C.

700 g of the polyester pellets and 300 g of glass fibers having a diameter of 13 μm and an average length of 50 μm were mixed in a polyethylene bag, granulated and injection-molded. The supply of the polymer from the hopper at the time of granulation was smooth, and the polymer was well led into the extruder by the screw. Further, the glass fibers were uniformly dispersed in the pellets, so that the injection-moldability was also good.

The physical properties of the test pieces obtained were as follows: Tensile strength, 1,240 kg/cm$^2$; modulus of elasticity, 7.2×10$^4$ kg/cm$^2$; heat distortion temperature, 278° C.; and whiteness, 72.

According to the pulverization method of the present invention, the aromatic polyester in a molten state can be granulated rationally and economically on a simple apparatus. In other words, the aromatic polyester after polymerization can be discharged in a molten state from the polymerization equipment and granulated as it is.

What is claimed is:

1. A process for producing an aromatic polyester which comprises
   (1) charging the following components to a vessel,
      (A) 30 to 80% by mole of component A consisting of at least one compound having the formula, wherein R$_1$ is hydrogen, formyl, acetyl, propionyl or benzoyl, and R$_2$ is hydrogen, C$_1$–C$_6$ alkyl or C$_6$–C$_{18}$ aryl, or a mixture of not less than 50% by mole of at least one compound having the formula, wherein R$_1$ and R$_2$ have the same meanings as defined above, and less than 50% by mole of at least one compound having the formula, wherein $R_1$ and $R_2$ have the same meanings as defined above,

(B) 10 to 35% by mole of component B consisting of at least one compound having the formula,

$R_3O-A_1-OR_3$ wherein $A_1$ is a divalent aromatic residue, and $R_3$ is hydrogen, acetyl, propionyl or benzoyl, and

(C) 10 to 35% by mole of component C consisting of at least one compound having any one of the formulas, wherein $R_4$ is hydroxyl, $C_1-C_6$ alkyloxy, $C_6-C_{18}$ aryloxy or halogen, or a mixture of not less than 50% by mole of at least one compound having any one of the formulas, wherein $R_4$ represents the same meaning as defined above, and less than 50% by mole of at least one compound having the formula, $R_4CO-Ar-COR_4$ wherein Ar is a divalent aromatic residue, and $R_4$ has the same meaning as defined above, (2) carrying out a polycondensation reaction in the vessel at a temperature of 270° to 380° C., and (3) discharging the aromatic polyester in a molten state from the vessel when the flow temperature of the aromatic polyester reaches a temperature between 240° C. and a temperature not less than 20° C. below the reaction temperature.

2. A process according to claim 1, which process is followed by
   (4) pulverizing the solidified aromatic polyester into particles having an average particle diameter of 3 mm or less, and
   (5) treating the particles at 270° C. to 370° C. for 1 to 20 hours in an inert gas atmospheric and/or under reduced pressure.

3. A process according to claim 1, wherein the polycondensation reaction temperature is 270° C. to 350° C.

4. A process according to claim 1, wherein the polycondensation reaction temperature is 280° C. to 330° C.

5. A process according to claim 1, which process is followed by
   (4) supplying the aromatic polyester discharged from the vessel in a molten state between two rolls, at least one of which has plural grooves on the surface, and which are arranged so that their rotation axes are parallel to each other, passing the aromatic polyester in a molten state through the grooves by rotating the rolls, and extruding it into strings or sheets formed by junction of plural strings, after which the extrudate is cooled, solidified and cut or pulverized, and
   (5) treating the resulting pellet or particles at 270° C. to 370° C. for 1 to 20 hours in an inert gas atmosphere and/or under reduced pressure.

6. An aromatic polyester obtained by the process according to claim 1.

* * * * *